United States Patent
Tian

(10) Patent No.: US 10,191,293 B2
(45) Date of Patent: Jan. 29, 2019

(54) GRATING CONTROLLING METHOD AND APPARATUS, GRATING, DISPLAY PANEL, AND THREE-DIMENSIONAL (3D) DISPLAY DEVICE

(71) Applicants: BOE TECHNOLOGY GROUP CO., LTD., Beijing (CN); CHENGDU BOE OPTOELECTRONICS TECHNOLOGY CO., LTD., Chengdu, Sichuan (CN)

(72) Inventor: Hua Tian, Beijing (CN)

(73) Assignees: BOE TECHNOLOGY GROUP CO., LTD., Beijing (CN); CHUNGDU BOE OPTOELECTRONICS TECHNOLOGY CO., LTD., Chengdu (CN)

(*) Notice: Subject to any disclaimer, the term of this patent is extended or adjusted under 35 U.S.C. 154(b) by 422 days.

(21) Appl. No.: 14/769,752

(22) PCT Filed: Oct. 11, 2014

(86) PCT No.: PCT/CN2014/088412
§ 371 (c)(1),
(2) Date: Aug. 21, 2015

(87) PCT Pub. No.: WO2016/008221
PCT Pub. Date: Jan. 21, 2016

(65) Prior Publication Data
US 2016/0274372 A1 Sep. 22, 2016

(30) Foreign Application Priority Data
Jul. 18, 2014 (CN) .......................... 2014 1 0345293

(51) Int. Cl.
*G02B 27/22* (2018.01)
*H04N 13/376* (2018.01)
(Continued)

(52) U.S. Cl.
CPC ..... *G02B 27/2214* (2013.01); *G02B 27/0093* (2013.01); *H04N 13/31* (2018.05);
(Continued)

(58) Field of Classification Search
None
See application file for complete search history.

(56) References Cited

U.S. PATENT DOCUMENTS

2002/0001128 A1* 1/2002 Moseley .............. G02B 5/3016
359/465
2008/0143895 A1* 6/2008 Peterka .............. G02B 27/0093
349/15
(Continued)

FOREIGN PATENT DOCUMENTS

CN 102798982 A 11/2012
CN 102868894 A 1/2013
(Continued)

OTHER PUBLICATIONS

Machine translation of CN 103197474 A.*
(Continued)

*Primary Examiner* — David N Werner
(74) *Attorney, Agent, or Firm* — Harness, Dickey & Pierce, P.L.C.

(57) ABSTRACT

The present disclosure provides a grating controlling method and apparatus, a grating, a display panel, and a 3D display device for achieving 3D displaying. The grating controlling method is applied to a grating, in which the grating cooperates with a display panel used for outputting left-eye images and right-eye images to achieve the 3D displaying. The grating controlling method may include: obtaining a current position of an eye of an observer who is observing 3D images; and adjusting slit positions of the grating according to the current position, so as to enable the left-eye images
(Continued)

to be observed by the left-eye of the observer through the adjusted slits, while to enable the right-eye images to be observed by the right-eye of the observer through the adjusted slits.

9 Claims, 5 Drawing Sheets

(51) Int. Cl.
    *H04N 13/31*     (2018.01)
    *H04N 13/383*     (2018.01)
    *G02B 27/00*     (2006.01)
    *G02F 1/29*     (2006.01)

(52) U.S. Cl.
    CPC ......... *H04N 13/376* (2018.05); *H04N 13/383* (2018.05); *G02F 1/292* (2013.01)

(56) References Cited

U.S. PATENT DOCUMENTS

| | | | |
|---|---|---|---|
| 2010/0060983 A1* | 3/2010 | Wu | H04N 13/0413 359/466 |
| 2010/0123952 A1 | 5/2010 | Chen et al. | |
| 2010/0302136 A1* | 12/2010 | Arcuri | G02B 27/0093 345/156 |
| 2011/0051239 A1* | 3/2011 | Daiku | G02B 27/0093 359/464 |
| 2011/0157696 A1* | 6/2011 | Bennett | G06F 3/14 359/462 |
| 2012/0033297 A1* | 2/2012 | Hsiao | G02B 27/0093 359/462 |
| 2012/0062560 A1 | 3/2012 | Swoboda et al. | |
| 2012/0200680 A1* | 8/2012 | So | G02B 27/2214 348/54 |
| 2013/0093753 A1* | 4/2013 | Rissa | G02B 27/2214 345/419 |
| 2013/0187961 A1* | 7/2013 | Hunt | G02B 27/0093 345/697 |
| 2013/0321482 A1* | 12/2013 | Goro | G09G 5/10 345/690 |
| 2014/0063207 A1* | 3/2014 | Li | H04N 13/398 348/51 |
| 2014/0320614 A1* | 10/2014 | Gaudreau | G02B 27/2214 348/51 |
| 2014/0375778 A1* | 12/2014 | Miao | H04N 13/31 348/51 |

FOREIGN PATENT DOCUMENTS

| | | |
|---|---|---|
| CN | 202815375 U | 3/2013 |
| CN | 103197474 A | 7/2013 |

OTHER PUBLICATIONS

First Office Action regarding Chinese application No. 201410345293.7, dated Jul. 28, 2016. Translation provided by Dragon Intellectual Property Law Firm.

Written Opinion of the International Searching Authority for international application No. PCT/CN2014/088412.

\* cited by examiner

GRATING CONTROLLING METHOD AND APPARATUS, GRATING, DISPLAY PANEL, AND THREE-DIMENSIONAL (3D) DISPLAY DEVICE

CROSS-REFERENCE TO RELATED APPLICATION

The present application is the U.S. national phase of PCT Application No. PCT/CN2014/088412 filed on Oct. 11, 2014, which claims a priority of the Chinese patent application No. 201410345293.7 filed on Jul. 18, 2014, both of which are incorporated herein by reference in their entirety.

TECHNICAL FIELD

The present disclosure relates to the field of three-dimensional (3D) displaying technology, in particular to a grating controlling method and apparatus, a grating, a display panel, and a 3D display device for achieving 3D displaying.

BACKGROUND

For the early 3D display technology, a 3D spectacle is mainly used to view a 3D image, while a binocular parallax-based autostereoscopic 3D display device is used as a mainstream product now. Grating is one of the elements capable of achieving the autostereoscopic 3D displaying, as shown in FIG. 1, which is a schematic view illustrating the principle of separating light transmission paths for a left-eye image and a right-eye image by the grating. Due to the existence of the grating 1, the left-eye image displayed by a display panel 2 can merely be viewed by a left eye, and the right-eye image can merely be viewed by a right eye, so as to provide a stereoscopic parallax effect for a viewer, thereby achieving the 3D display.

FIG. 2 is a schematic view illustrating light transmission paths when human eyes move while viewing a 3D image. As shown in FIG. 2, with respect to the conventional 3D displaying, when the left-eye 100 of an observer is at position A and observes an image, a left-eye image on the display panel 2 (i.e., the dark parts on the display panel 2 in FIG. 1) can just be obtained. However, when the left-eye 100 of the observer moves to position B and observes the image, an image produced for the left-eye 100 after going through the grating further includes a right-eye image part (i.e., the white parts on the display panel 2 in FIG. 1), which results in crosstalk.

Therefore, with respect to the conventional grating-type autostereoscopic 3D displaying, observing positions are relatively fixed, i.e., the observing positions cannot move away from several points within an optimal observing plane. When the observing positions do move away therefrom, crosstalk increases significantly, which results in adverse effects on the observing needs.

SUMMARY

An object of the present disclosure is to provide a grating controlling method and apparatus, a grating, a display panel, and a 3D display device for achieving 3D displaying, so as to reduce crosstalk due to human eye movement upon observing 3D displaying.

In one aspect, the present disclosure provides a grating controlling method for achieving three-dimensional (3D) displaying, in which a grating cooperates with a display panel used for outputting left-eye images and right-eye images to achieve the 3D displaying. The grating controlling method may include: obtaining a current position of an eye of an observer who is observing 3D images; and adjusting slit positions of the grating according to the current position, so as to enable the left-eye images to be observed by the left-eye of the observer through the adjusted slits, while to enable the right-eye images to be observed by the right-eye of the observer through the adjusted slits.

Alternatively, the method may further include the following step subsequent to the obtaining a current position of an eye of an observer who is observing 3D images: calculating a distance S between the current position and a base position in a direction parallel to a connection line of the left-eye and the right-eye of the observer, wherein the grating comprises an original slit position; and the base position is a position when the left-eye images are observed by the left-eye of the observer through the original slits and the right-eye images are observed by the right-eye of the observer through the original slits simultaneously.

Alternatively, the adjusting slit positions of the grating according to the current position may include: adjusting slit positions of the grating on the basis of the original slit position, according to the distance S.

Alternatively, the grating may be a liquid crystal grating; and the adjusting slit positions of the grating on the basis of the original slit position, according to the distance S may include: determining a corresponding value t, when the distance S is within the following value range:

$$\left[ \frac{(2t-1)I}{2n} + 2mI, \frac{(2t+1)I}{2n} + 2mI \right),$$

where t=0, 1, 2, ... n, m∈N, I is an interpupillary distance of human eyes, n is a number of grating elements corresponding to a width of one slit of the liquid crystal grating; determining a moving direction from the base position to the current position; and enabling the slit position of the grating to move by t grating elements in the moving direction from the base position to the current position.

In another aspect, the present disclosure also provides a grating controlling apparatus for achieving three-dimensional (3D) displaying, in which a grating cooperates with a display panel used for outputting left-eye images and right-eye images to achieve the 3D displaying. The grating controlling apparatus may include: an eye tracking module configured to obtain a current position of an eye of an observer who is observing 3D images; and a driving module configured to adjust slit positions of the grating according to the current position, so as to enable the left-eye images to be observed by the left-eye of the observer through the adjusted slits, while to enable the right-eye images to be observed by the right-eye of the observer through the adjusted slits.

Alternatively, the grating controlling apparatus may further include: a calculating module configured to calculate a distance S between the current position and a base position in a direction parallel to a connection line of the left-eye and the right-eye of the observer, wherein the grating comprises an original slit position; and the base position is a position when the left-eye images are observed by the left-eye of the observer through the original slits and the right-eye images are observed by the right-eye of the observer through the original slits simultaneously.

Alternatively, the driving module may adjust slit positions of the grating on the basis of the original slit position, according to the distance S.

Alternatively, the driving module may include: a first determining unit configured to determine a corresponding value t, when the distance S is within the following value range:

$$\left[\frac{(2t-1)l}{2n}+2ml, \frac{(2t+1)l}{2n}+2ml\right],$$

where t=0, 1, 2, . . . n, m∈N, l is an interpupillary distance of human eyes, n is a number of grating elements corresponding to a width of one slit of the liquid crystal grating; a second determining unit configured to determine a moving direction from the base position to the current position; and an execution unit configured to enable the slit position of the grating to move by t grating elements in the moving direction from the base position to the current position.

Alternatively, the grating may be a liquid crystal grating; and the liquid crystal grating may include: a first transparent electrode layer configured to comprise a plurality of first electrodes arranged in parallel; a second transparent electrode layer configured to be arranged opposite to the first transparent electrode layer and comprise second plate-like electrodes; and a liquid crystal layer configured to be arranged between the first transparent electrode layer and the second transparent electrode layer. A width of one grating element of the liquid crystal grating may substantially equal to a width of one first electrode.

Alternatively, the grating may be a liquid crystal grating; and the liquid crystal grating may include: a first transparent electrode layer configured to comprise a plurality of first electrodes arranged in parallel; a second transparent electrode layer configured to be arranged opposite to the first transparent electrode layer and comprise a plurality of second electrodes arranged in parallel, wherein the first electrodes and the second electrodes are extended in a same direction and are arranged alternately; and wherein each second electrode has an opposite overlapping section with each of two adjacent first electrodes respectively; and a liquid crystal layer configured to be arranged between the first transparent electrode layer and the second transparent electrode layer. A width of one grating element of the liquid crystal grating substantially equals to a width of one opposite overlapping section between one first electrode and a corresponding second electrode.

Alternatively, the plurality of first electrodes may be arranged in sequence without gaps; the plurality of second electrodes may be arranged in sequence without gaps; a width of one of the first electrodes may substantially equal to a width of one of the second electrodes; and a width of one grating element may substantially equal to a half of the width of one of the first electrodes.

In yet another aspect, the present disclosure also provides a grating on which any one of the above grating controlling apparatuses is arranged.

In still yet another aspect, the present disclosure also provides a display panel which cooperates with a grating to achieve the three-dimensional (3D) displaying, wherein any one of the above grating controlling apparatuses is arranged on the display panel.

In still yet another aspect, the present disclosure also provides a three-dimensional (3D) display device, which may include: a display panel; and the above grating.

In still yet another aspect, the present disclosure also provides a three-dimensional (3D) display device, which may include: a grating; and the above display panel.

The present disclosure at least has the following advantageous effects. By tracking positions of human eyes of an observer, the slit positions of a grating are able to correspond to the current position of human eyes, so as to facilitate 3D displaying after human eye movement, thereby reducing the resultant crosstalk and ensuring a wide angle 3D image displaying achieved by the 3D display device.

BRIEF DESCRIPTION OF THE DRAWINGS

In order to more clearly illustrate the technical solutions in embodiments of the present disclosure or in the prior art, accompanying drawings to be used in the description of embodiments will be described briefly. It is obvious that following described drawings is only some embodiments of the invention, and other drawings can also be obtained according to these drawings for those of ordinary skill in the art without paying creative work.

FIG. 8b is a schematic view illustrating a structure after it has been moved by one grating element to the right side on the basis of the original slit state as illustrated in FIG. 8a;

DETAILED DESCRIPTION

Embodiments of the present invention will be further described below in conjunction with the accompanying drawings and examples. The following embodiments are only used to illustrate the present invention, but not intended to limit the scope of the present invention.

In order to make the object, technical solutions and advantages of embodiments of the present invention more clear, technical solutions of embodiments of the present invention will be clearly and completely described below in conjunction with the accompanying drawings of the embodiments of the present invention. It is obvious that the described embodiments are only part of embodiments of the present invention, but not all embodiments. All other embodiments obtained by those of ordinary skill in the art based on the described embodiments of the present invention are fallen within the protection scope of the present invention.

Unless otherwise defined, technical terms or scientific terms used herein shall have the general meaning which can be understood by those of ordinary skill in the art. The terms "first", "second" or the like used in the specification and claims of the present invention do not denote any sequence, quantity, or importance, but rather are used to distinguish different components. Similarly, the terms "a" or "an" or the like do not mean quantitative restrictions, but rather indicate the presence of at least one. The terms "connect" or "couple" or the like are not limited to connect physically or mechanically, but may include connecting electrically either directly or indirectly. The terms "up", "down", "left", "right", etc., are merely used to indicate a relative positional relationship; when the absolute position of the described object is changed, the relative positional relationship is changed correspondingly.

Principles and features of the present invention will be described in conjunction with the accompanying drawings. All described embodiments are merely used to illustrate the present invention, but not intended to limit the scope of the invention.

Figure 3:
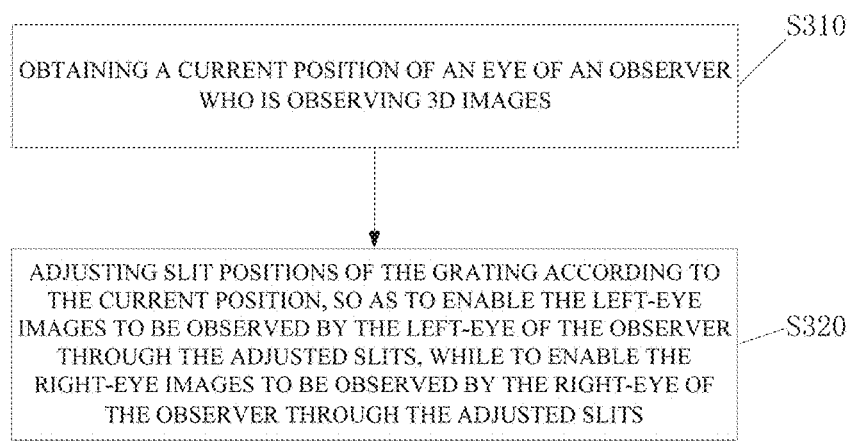
FIG. 3 is a flow chart illustrating the grating controlling method according to embodiments of the present disclosure.

FIG. 3 is a flow chart illustrating the grating controlling method according to embodiments of the present disclosure. As shown in FIG. 3, it is provided is a grating controlling method for achieving three-dimensional (3D) displaying, in which a grating cooperates with a display panel used for outputting left-eye images and right-eye images to achieve the 3D displaying. The grating controlling method may include:

Step S310, obtaining a current position of an eye of an observer who is observing 3D images; and Step S320, adjusting slit positions of the grating according to the current position, so as to enable the left-eye images to be observed by the left-eye of the observer through the adjusted slits, while to enable the right-eye images to be observed by the right-eye of the observer through the adjusted slits.

According to the grating controlling method provided by embodiments of the present disclosure, by tracking positions of human eyes of an observer, the slit position of a grating is able to correspond to the current position of human eyes, so as to facilitate 3D displaying after human eye movement, thereby reducing the resultant crosstalk and ensuring a wide angle 3D image displaying achieved by the 3D display device.

In a certain embodiment of the present disclosure as shown in FIG. 3, the grating controlling method may further include the following step subsequent to Step S310:

calculating a distance S between the current position and a base position in a direction parallel to a connection line of the left-eye and the right-eye of the observer, wherein the grating comprises an original slit position; and the base position is a position when the left-eye images are observed by the left-eye of the observer through the original slits and the right-eye images are observed by the right-eye of the observer through the original slits simultaneously.

Based on the above, in Step S320, the adjusting slit positions of the grating according to the current position may specifically include:

adjusting slit positions of the grating on the basis of the original slit position, according to the distance S.

Specifically, when the grating is a liquid crystal grating, the above Step S320 may include:

determining a corresponding value t, when the distance S is within the following value range:

$$\left[\frac{(2t-1)I}{2n} + 2mI, \frac{(2t+1)I}{2n} + 2mI\right) \quad (1)$$

where t=0, 1, 2, ... n, m∈N, I is an interpupillary distance of human eyes, n is a number of grating elements corresponding to a width of one slit of the liquid crystal grating;

determining a moving direction from the base position to the current position; and enabling the slit position of the grating to move by t grating elements in the moving direction from the base position to the current position.

For example, n=4, in other words, when a width of one slit within the liquid crystal grating corresponds to four grating elements, the following value ranges may be derived from the above equation (1), including:

when $t = 0$, then $\left[-\frac{I}{8} + 2mI, \frac{I}{8} + 2mI\right)$;

when $t = 1$, then $\left[\frac{I}{8} + 2mI, \frac{3I}{8} + 2mI\right)$;

when $t = 2$, then $\left[\frac{3I}{8} + 2mI, \frac{5I}{8} + 2mI\right)$;

when $t = 3$, then $\left[\frac{5I}{8} + 2mI, \frac{7I}{8} + 2mI\right)$; and when $t = 4$, then $\left[\frac{7I}{8} + 2mI, \frac{9I}{8} + 2mI\right)$.

Based on the above value ranges, when distance S of the current position of the observer with respect to a base position is obtained by calculation, it is determined which value range the distance S belongs to among the above value ranges, and then a corresponding t can be determined according to the determined value range. Thereafter according to the grating controlling method provided by the present disclosure, the slit position of the grating is caused to move by t grating elements in the moving direction from the base position to the current position.

Figure 4:
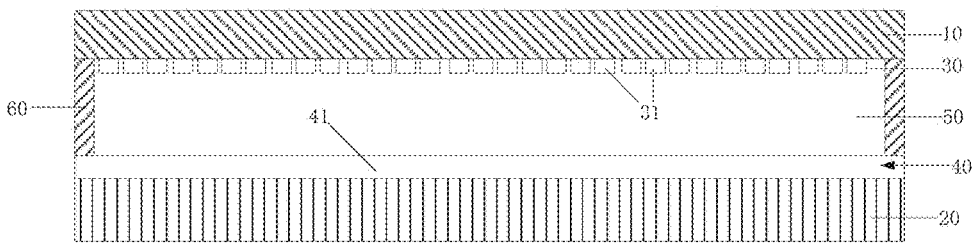
FIG. 4 is a schematic view illustrating a first embodiment of a structure of a liquid crystal grating which achieves the grating controlling method according to the embodiments of the present disclosure.

FIG. 4 is a schematic view illustrating a first embodiment of a structure of a liquid crystal grating which achieves the grating controlling method according to embodiments of the present disclosure. Specific methods for adjusting slit positions of a grating according to the grating controlling method provided by the disclosure will be described in detailed as below, in connection with FIGS. 5a, 5b, 6, 7.

The grating may be a liquid crystal grating. As shown in FIG. 4, as can be appreciated by a skilled person in the art, the liquid crystal grating may include: a first substrate 10 and a second substrate 20 which are arranged opposite to each other; a first transparent electrode layer 30 which is arranged on the first substrate 10; a second transparent electrode layer 40 which is arranged on the second substrate 20; a liquid crystal layer 50 which is arranged between the first transparent electrode layer 30 and the second transparent electrode layer 40; and support 60 which is arranged between the first transparent electrode layer 30 and the second transparent electrode layer 40 and plays a role of forming a cell height of the liquid crystal layer 50.

In this embodiment, the first transparent electrode layer 30 includes a plurality of first stripe-like electrodes 31 arranged in parallel; and the second transparent electrode layer 40 includes second plate-like electrodes 41. When different controlling voltages are inputted into respective first stripe-like electrodes 41, liquid crystal molecules within the liquid crystal layer 50 rotate under the force of different controlling electric fields between the first electrodes 31 and the second electrodes 41, thereby forming dark fringes or bright fringes and these two kinds of fringes being arranged alternately.

Based on the above, presentation patterns of the liquid crystal grating can be determined by controlling voltages inputted into the first electrodes 31 arranged on the first transparent electrode layer 30. The first electrodes 31 are a minimal unit of forming a liquid crystal grating, each of which corresponds to one grating element. In other words, a width of one grating element equals to a width of one first electrode 31. Furthermore, when forming dark fringes and bright fringes of the liquid crystal grating, n adjacent first electrodes 31 may have the same inputted voltage; and an electric field can be formed between the n adjacent first electrodes 31 and the corresponding second electrodes 41. Under the controlling of the above electric field, dark fringes and bright fringes are formed. Namely, in the liquid crystal grating, a width of one slit (i.e., bright fringe) equals to a width of n grating elements.

Figure 1:
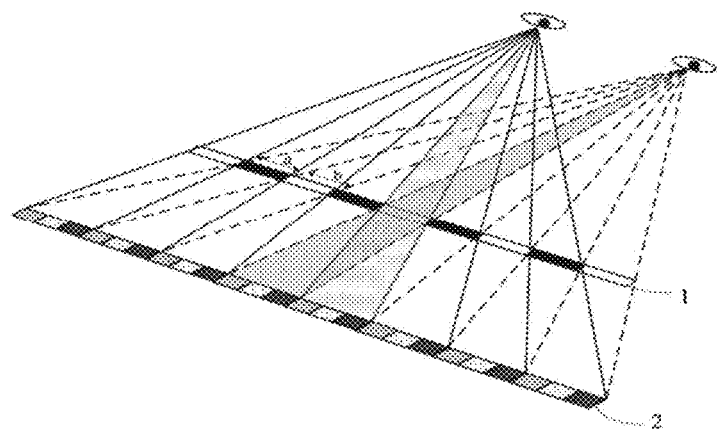
FIG. 1 is a schematic view illustrating the principle of separating light transmission paths for a left-eye image and a right-eye image by a grating according to the related art.
Figure 2:
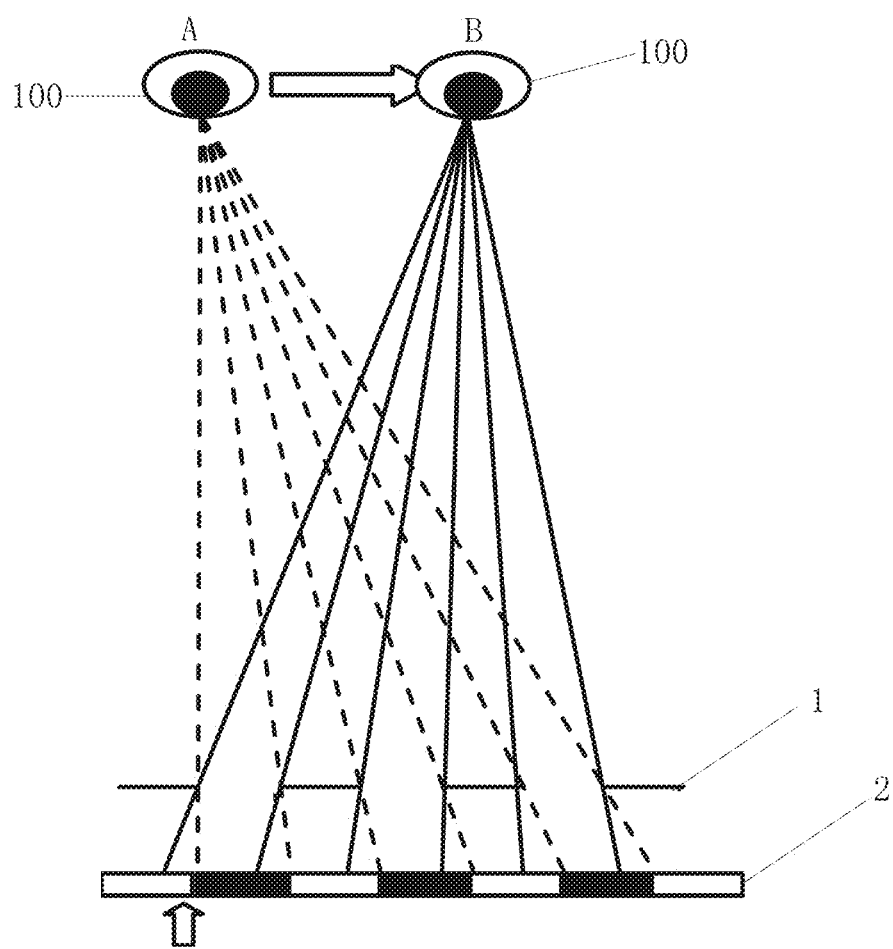
FIG. 2 is a schematic view illustrating light transmission paths when human eyes move upon observing 3D displaying.

In connection with FIGS. 1 and 2, as can be appreciated by a skilled person in the art, based on the above liquid crystal grating arrangement, when slit positions of the liquid crystal grating are fixed and 3D images on the display panel 2 are observed by human eyes, there exist several fixed positions suitable for optimal 3D image observance in front of the display panel 2. When observing at one of these fixed positions, the left-eye images are just able to be observed by the left-eye of the observer through the corresponding slits, while the right-eye images are able to be observed by the right-eye of the observer through the corresponding slits. According to the grating controlling method provided by the present disclosure, an optimal observance position for observing 3D images corresponding to an original silt position of the liquid crystal grating is taken as a base position. A distance S is determined as human eye displacement from the base position; and thereafter based on the distance S, slit positions of the liquid crystal grating can be adjusted accordingly.

Figure 5A:
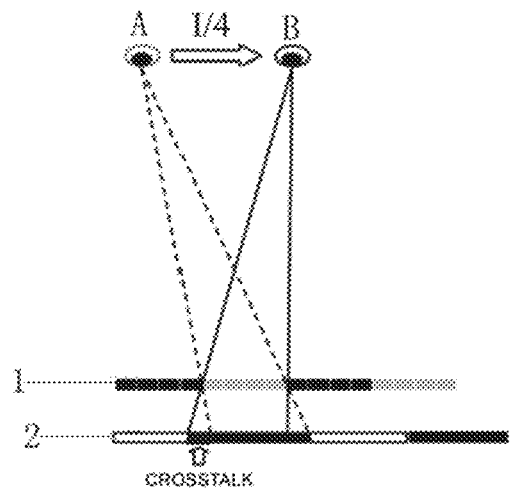
FIGS. 5a and 5b are schematic views illustrating the contrast between one without adjusting slit position(s) of the grating and the other having slit position(s) adjusted according to equation (1), when human eyes move by one fourth of interpupillary distance.
Figure 5B:
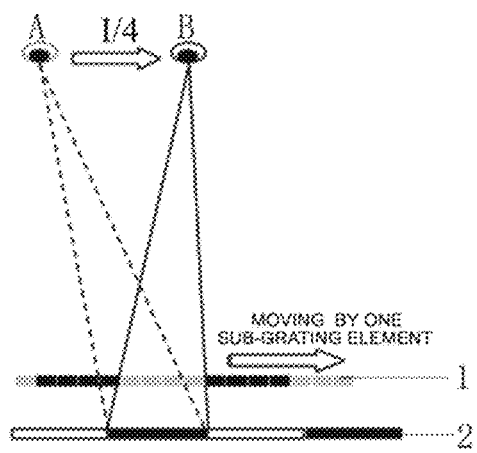

As shown in FIGS. 5*a* and 5*b*, human eyes moving by l/4 to the right is taken as an example. In other words, human eyes move by l/4 to the right with respect to the base position A. When human eyes move to a current position B, provided that silt positions arranged in the current grating 1 are fixed, left-eye image account for ¼ portion of the image observed by the right-eye, i.e., having a crosstalk of 25%, as shown in FIG. 5*a*. When S=l/4, according to the above equation (1), $$m=0, S\in\left[\frac{l}{4},\frac{3l}{8}\right).$$

When S is within this value range, the corresponding t for this value range equals to 1. In connection with FIG. 4, bright and dark fringes of the grating 1 are caused to move by a width of one grating element to the right, by changing the voltage inputted into first electrodes 31 of the grating 1. Namely it is moved by a width of one first electrode 31 to the right, so as to achieve that silts of the grating 1 are caused to move by ¼ grating pitch to the right. At this time, human eyes are located at the current position B, where the corresponding images can be observed through slits, without crosstalk, i.e., crosstalk being zero.

Figure 6:
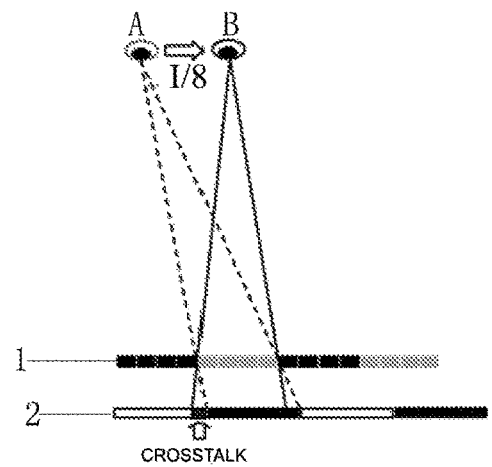
FIG. 6 is a schematic view illustrating light transmission after slit position(s) is(are) adjusted according to equation (1), when human eyes move by one eighth of interpupillary distance.

As shown in FIG. 6, human eyes moving by l/8 to the right from the base position A to the current position B is taken as an example, i.e., when S=l/8. According to the above equation (1), $$m=0, S\in\left[-\frac{l}{8},\frac{l}{8}\right).$$

When S is within this value range, the corresponding t for this value range equals to 0. At this time, no action is taken for adjusting slit positions of the grating 1. When 3D images on the display panel 2 are observed through slits from the position B, there is 12.5% crosstalk, i.e., ½n crosstalk, which is a maximal crosstalk value by using this grating 1.

Figure 7:
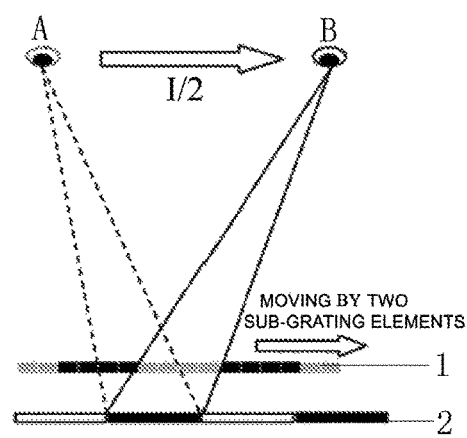
FIG. 7 is a schematic view illustrating light transmission after slit position(s) is(are) adjusted according to equation (1), when human eyes move by one half of interpupillary distance.

As shown in FIG. 7, human eyes moving by l/2 to the right from the base position A to the current position B is taken as an example, i.e., when S=l/2. According to the above equation (1), $$m=0, S\in\left[\frac{3l}{8},\frac{5l}{8}\right).$$

When S is within this value range, the corresponding t for this value range equals to 2. At this time, bright and dark fringes of the grating 1 are caused to move by a width of two grating elements to the right. Namely it is moved by a width of two first electrodes 31 to the right, so as to achieve that silts of the grating 1 are caused to move by ½ grating pitch to the right. At this time, human eyes are located at the current position B, where the corresponding images can be observed through slits, without crosstalk, i.e., crosstalk being zero.

Furthermore, when $$S\in\left[\frac{l}{8},\frac{l}{4}\right),$$

which belongs to the value range $$\left[\frac{l}{8},\frac{3l}{8}\right)$$

in the above equation, and the corresponding t for this value range is 1. In other words, in a direction from the current position B to the base position A, the slits of the grating 1 move by the width of one grating element to the right. The corresponding crosstalk decreases as a distance of human eye displacement from the base position increases. However, the maximal crosstalk value is still 12.5%.

When $$S \in \left[\frac{I}{8}, \frac{3I}{8}\right),$$

which also belongs to the value range $$\left[\frac{I}{8}, \frac{3I}{8}\right)$$

in the above equation. As shown in the equation (1), when S is within this value range, t=1 and m=0, which indicates that slits of the grating 1 are caused to move by the width of one grating element to the right. When $$S \in \left[\frac{3I}{8}, \frac{5I}{8}\right),$$

t=2 and m=0, which indicates that slits of the grating 1 are caused to move by the width of two grating elements to the right. When $$S \in \left[\frac{5I}{8}, \frac{7I}{8}\right),$$

t=3 and m=0, which indicates that slits of the grating 1 are caused to move by the width of three grating elements to the right. Therefore, when human eyes displacement distance from the optimal observance position is I, if the grating is not moved, the image observed by the left/right eye is just the image that ought to be observed by the other eye, i.e., 100% crosstalk at this time. As opposed to it, according to embodiments of the present disclosure, the maximal crosstalk value is no more than ½n, which significantly reduces the crosstalk caused by the movement of the human eyes.

Similarly, when a distance for human eyes moving to the right from the base position A to the current position B is larger than an interpupillary distance I of human eyes, it is determined a value t which corresponds to a value range where the distance S belongs to based on the equation $$S \in \left[\frac{(2t-1)I}{2n} + 2mI, \frac{(2t+1)I}{2n} + 2mI\right),$$

the slit positions of the grating 1 are caused to move by t grating elements in a direction from the base position A to the current position B. As a result, the left-eye images are observed by the left-eye of the observer through the adjusted slits, while the right-eye images are observed by the right-eye of the observer through the adjusted slits. In this way, crosstalk due to human eye movement upon observing 3D displaying can be reduced. Better yet, such resultant crosstalk can even be avoided.

Figure 8A:
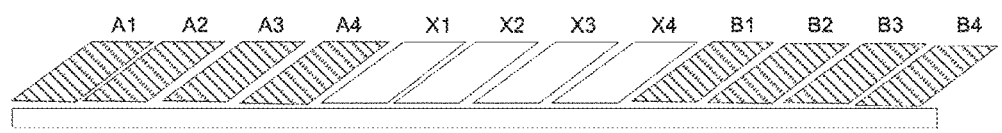
FIG. 8a is a schematic view illustrating an arrangement of first electrodes in an original slit state in the liquid crystal grating shown in FIG. 4.
Figure 8B:
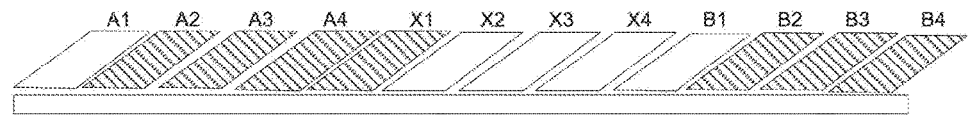

FIG. 8a is a schematic view illustrating an arrangement of the first electrodes 31 in the original slit state in the grating 1 shown in FIG. 4. According to the arrangement shown in FIG. 8a, when the original slit positions of the grating 1 are located at X1, X2, X3 and X4, namely voltages inputted into the first electrodes 31 at X1-X4 are different from voltages inputted into the first electrodes 31 at A1-A4, and B1-B4 at two ends of X1-X4, it is formed bright fringes at positions corresponding to X1-X4 of the grating 1, while it is formed dark fringes at positions corresponding to A1-A4, and B1-B4. In the above state, provided that it is intended to enable slit positions to move by one grating element to the right, then the voltage inputted into X1 is changed to be same as the voltage originally inputted into B4, while the voltage inputted into B1 is changed to be same as the voltage originally inputted into X4. In the above state, the voltages inputted into X2, X3, X4 and B1 are the same, it is formed bright fringes at corresponding positions of the grating 1. As a result, the slit position state shown in FIG. 8b is formed. Based on this principle, a skilled person in the art can appreciate a specific method about how to enable slit positions of the grating to move, which will not be elaborated herein.

Figure 9:
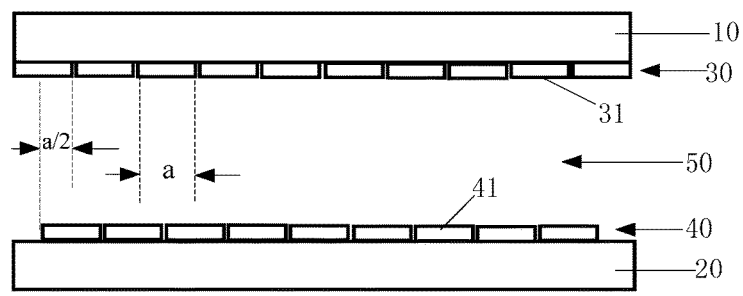
FIG. 9 is a schematic view illustrating a second embodiment of a structure of a liquid crystal grating which achieves the grating controlling method according to embodiments of the present disclosure.

FIG. 9 is a schematic view illustrating a second embodiment of a structure of a liquid crystal grating which achieves the grating controlling method according to embodiments of the present disclosure. In the second embodiment, the grating is a liquid crystal grating as well. Being same as the first embodiment, the liquid crystal grating includes: a first substrate 10 and a second substrate 20 which are arranged opposite to each other; a first transparent electrode layer 30 which is arranged on the first substrate 10; a second transparent electrode layer 40 which is arranged on the second substrate 20; and a liquid crystal layer 50 which is arranged between the first transparent electrode layer 30 and the second transparent electrode layer 40.

Furthermore, in the second embodiment, the first transparent electrode layer 30 includes a plurality of first stripe-like electrodes 31 arranged in parallel; and the second transparent electrode layer 40 includes a plurality of second strip-like electrodes 41 arranged in parallel. Furthermore, the first electrodes 31 and the second electrodes 41 are extended in a same direction and are arranged alternately. Alternatively, the plurality of first electrodes 31 is arranged in sequence without gaps; the plurality of second electrodes 41 is arranged in sequence without gaps; and each second electrode 41 has an opposite overlapping section with each of two adjacent first electrodes 31 respectively.

By means of the liquid crystal grating arrangement provided by the second embodiment, as compared with the liquid crystal grating arrangement provided by the first embodiment, the voltages inputted into respective second electrodes 41 can be controlled respectively. As a result, the width of one grating element of the liquid crystal grating substantially equals to the width of one opposite overlapping section between one first electrode 31 and a corresponding second electrode 41. In the condition that the width of each of the first electrodes 31 is known, the width of one grating element is smaller than the width of each of the first electrodes 31. On the basis of the liquid crystal grating arrangement provided by the first embodiment, such slit position adjustment of the liquid crystal grating can be achieved more delicately and accurately, thereby further reducing the resultant crosstalk based on the liquid crystal grating arrangement provided by the first embodiment.

Alternatively, the width of one of the first electrodes 31 substantially equals to the width of one of the second electrodes 41. As a result, one second electrode 41 is correspondingly located beneath two adjacent first electrodes 31 and is in the middle thereof, as shown in FIG. 9. When both the first electrodes and the second electrodes have the width of a, then the opposite overlapping section between one first electrode 31 and a corresponding second electrode 41 has a width of a/2. As a result, a width of one grating element substantially equals to one half of the width of one first electrode 31, i.e., a/2. By means of the liquid crystal grating provided by the second embodiment, provided that the width of one slit within the liquid crystal grating equals to a sum of widths of n adjacent first electrodes, then the width of one slit has 2n grating elements correspondingly. According to equation (1), the slit position adjustment of the liquid crystal grating can be achieved more delicately.

Therefore, according to the grating controlling method provided by the embodiments of the present disclosure, within the optimal observance plane of 3D displaying images, the crosstalk in the 3D displaying due to human eye movement can be reduced, and a wide angle autostereoscopic 3D image displaying can be achieved.

Figure 10:
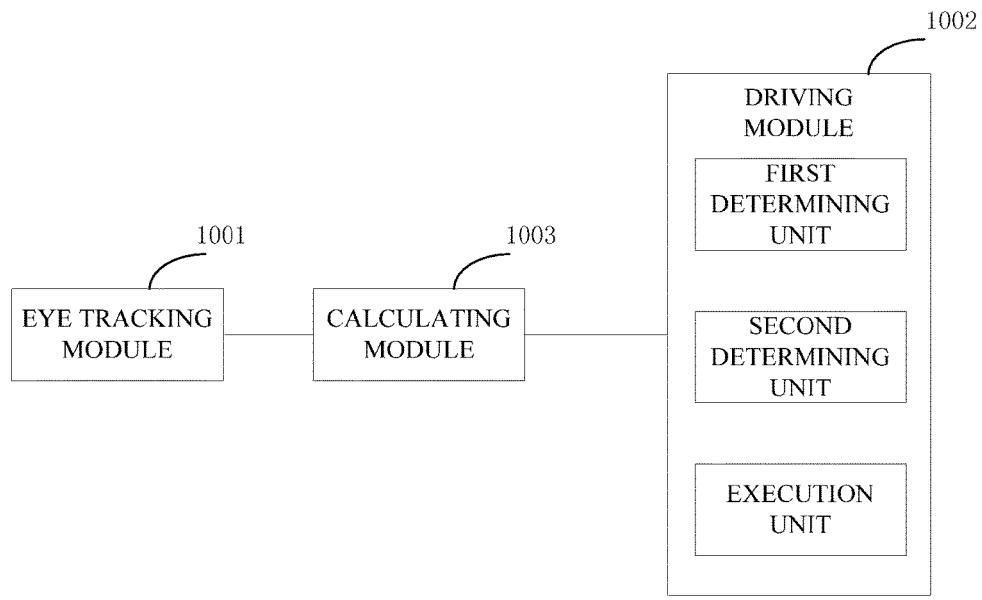
FIG. 10 is a schematic view illustrating a structure of the grating controlling apparatus according to embodiments of the present disclosure.

Another aspect of the present disclosure also provides a grating controlling apparatus applied to a grating for achieving three-dimensional (3D) displaying, in which a grating cooperates with a display panel used for outputting left-eye images and right-eye images to achieve the 3D displaying. As shown in FIG. 10, the grating controlling apparatus may include:

an eye tracking module 1001 configured to obtain a current position of an eye of an observer who is observing 3D images; and a driving module 1002 configured to adjust slit positions of the grating according to the current position, so as to enable the left-eye images to be observed by the left-eye of the observer through the adjusted slits, while to enable the right-eye images to be observed by the right-eye of the observer through the adjusted slits.

Furthermore, the grating controlling apparatus may further include:

a calculating module 1003 configured to calculate a distance S between the current position and a base position in a direction parallel to a connection line of the left-eye and the right-eye of the observer, wherein the grating comprises an original slit position; and the base position is a position when the left-eye images are observed by the left-eye of the observer through the original slits and the right-eye images are observed by the right-eye of the observer through the original slits simultaneously.

Specifically, the driving module adjusts slit positions of the grating on the basis of the original slit position, according to the distance S.

Furthermore, the driving module 1002 may include:

a first determining unit configured to determine a corresponding value t, when the distance S is within the following value range:

$$\left[ \frac{(2t-1)I}{2n} + 2mI, \frac{(2t+1)I}{2n} + 2mI \right)$$

where t=0, 1, 2, . . . n, m∈N, I is an interpupillary distance of human eyes, n is a number of grating elements corresponding to a width of one slit of the liquid crystal grating;

a second determining unit configured to determine a moving direction from the base position to the current position; and an execution unit configured to enable the slit position of the grating to move by t grating elements in the moving direction from the base position to the current position.

The method about how to adjust slit positions of the grating by the driving module 1002 may be contemplated by referring to the above grating adjustment method, which will not be further elaborated.

The liquid crystal grating using the grating controlling apparatus provided by embodiments of the present disclosure may have an arrangement as shown in FIG. 4. The liquid crystal grating may include:

a first transparent electrode layer 30 configured to comprise a plurality of first electrodes 31 arranged in parallel;

a second transparent electrode layer 40 configured to be arranged opposite to the first transparent electrode layer 30 and include second plate-like electrodes 41; and a liquid crystal layer 50 configured to be arranged between the first transparent electrode layer 30 and the second transparent electrode layer 40.

In the above embodiment, a width of one grating element substantially equals to a width of one first electrode.

The method about how to adjust slit positions of the liquid crystal grating having an arrangement of the above embodiment may be contemplated by referring to the above grating adjustment method, which will not be further elaborated.

Furthermore, the liquid crystal grating using the grating controlling apparatus provided by embodiments of the present disclosure may have an arrangement as shown in FIG. 9. The liquid crystal grating may include:

a first transparent electrode layer 30 configured to comprise a plurality of first electrodes 31 arranged in parallel;

a second transparent electrode layer 40 configured to be arranged opposite to the first transparent electrode layer 30 and include a plurality of second electrodes 41 arranged in parallel, wherein the first electrodes 31 and the second electrodes 41 are extended in a same direction and are arranged alternately; and wherein each second electrode 41 has an opposite overlapping section with each of two adjacent first electrodes 31 respectively; and a liquid crystal layer 50 configured to be arranged between the first transparent electrode layer 30 and the second transparent electrode layer 40.

In the above embodiment, the width of one grating element substantially equals to the width of opposite overlapping section between one first electrode and a corresponding second electrode.

Alternatively, the plurality of first electrodes 31 is arranged in sequence without gaps; the plurality of second electrodes 41 is arranged in sequence without gaps; a width of one of the first electrodes 31 substantially equals to a width of one of the second electrodes 41; and a width of one grating element substantially equals to one half of the width of one of the first electrodes.

The method about how to adjust slit positions of the liquid crystal grating having an arrangement of the above embodiment may be contemplated by referring to the above grating adjustment method, which will not be further elaborated.

The grating controlling apparatus provided by embodiments of the present disclosure may be arranged on a grating of a 3D display device, or on a display panel thereof, as long as the controlling on the grating can be achieved.

Another aspect of the present disclosure also provides a grating, on which the grating controlling apparatus having the above arrangement is arranged. Herein the grating may have an arrangement as shown in FIG. 4 or FIG. 9.

Still another aspect of the present disclosure also provides a display panel which cooperates with a grating to achieve the three-dimensional (3D) displaying. Herein the grating controlling apparatus having the above arrangement is arranged on the display panel.

Yet still another aspect of the present disclosure also provides a 3D display device which includes the above grating or the above display panel.

A skilled person in the art can appreciate a specific circuit structure for arranging the above grating controlling apparatus on the grating or on the display panel, which is not main part of this application. Therefore, this part will not be described in detail herein.

The above are merely the preferred embodiments of the present disclosure. It should be appreciated that, a person skilled in the art may make further modifications and improvements without departing from the principle of the present disclosure, and these modifications and improvements shall also fall within the scope of the present disclosure.

What is claimed is:

1. A grating controlling method for achieving three-dimensional (3D) displaying, in which a grating cooperates with a display panel used for outputting left-eye images and right-eye images to achieve the 3D displaying, the grating controlling method comprising:

obtaining a current position of an eye of an observer who is observing 3D images;

calculating a distance S between the current position and a base position in a direction parallel to a connection line of the left-eye and the right-eye of the observer, wherein the grating comprises an original slit position and the base position is a position when the left-eye images are observed by the left-eye of the observer through the original slits and the right-eye images are observed by the right-eye of the observer through the original slits simultaneously; and adjusting slit positions of the grating according to the current position, so as to enable the left-eye images to be observed by the left-eye of the observer through the adjusted slits, while to enable the right-eye images to be observed by the right-eye of the observer through the adjusted slits, wherein the grating is a liquid crystal grating, and adjusting the slit positions of the grating according to the current position comprises:

adjusting the slit positions of the grating on the basis of the original slit position, according to the distance S, wherein adjusting the slit positions of the grating on the basis of the original slit position, according to the distance S comprises:

determining a corresponding value t, when the distance S is within the following value range $$\left[ \frac{(2t-1)I}{2n} + 2mI, \frac{(2t+1)I}{2n} + 2mI \right],$$

where t=0, 1, 2, . . . n, m∈N, I is an interpupillary distance of human eyes, and n is a number of grating elements corresponding to a width of one slit of the liquid crystal grating;

determining a moving direction from the base position to the current position; and enabling the slit position of the grating to move by t grating elements in the moving direction from the base position to the current position.

2. A grating controlling apparatus for achieving three-dimensional (3D) displaying, in which a grating cooperates with a display panel used for outputting left-eye images and right-eye images to achieve the 3D displaying, the grating controlling apparatus comprising:

an eye tracking circuit configured to obtain a current position of an eye of an observer who is observing 3D images;

a calculating circuit configured to calculate a distance S between the current position and a base position in a direction parallel to a connection line of the left-eye and the right-eye of the observer, wherein the grating comprises an original slit position; and the base position is a position when the left-eye images are observed by the left-eye of the observer through the original slits and the right-eye images are observed by the right-eye of the observer through the original slits simultaneously; and a driving circuit configured to adjust slit positions of the grating according to the current position, so as to enable the left-eye images to be observed by the left-eye of the observer through the adjusted slits, while to enable the right-eye images to be observed by the right-eye of the observer through the adjusted slits, wherein the grating is a liquid crystal grating, the driving circuit adjusts slit positions of the grating on the basis of the original slit position, according to the distance S, and the driving circuit comprises:

a first determining circuit configured to determine a corresponding value t, when the distance S is within the following value range:

$$\left[ \frac{(2t-1)I}{2n} + 2mI, \frac{(2t+1)I}{2n} + 2mI \right],$$

where t=0, 1, 2, . . . n, m ∈ N, I is an interpupillary distance of human eyes, n is a number of grating elements corresponding to a width of one slit of the liquid crystal grating;

a second determining circuit configured to determine a moving direction from the base position to the current position; and an execution circuit configured to enable the slit position of the grating to move by t grating elements in the moving direction from the base position to the current position.

3. The grating controlling apparatus according to claim 2, wherein the grating is a liquid crystal grating; and the liquid crystal grating comprises:

a first transparent electrode layer configured to comprise a plurality of first electrodes arranged in parallel;

a second transparent electrode layer configured to be arranged opposite to the first transparent electrode layer and comprise second plate-like electrodes; and a liquid crystal layer configured to be arranged between the first transparent electrode layer and the second transparent electrode layer, wherein a width of one grating element of the liquid crystal grating substantially equals to a width of one first electrode.

4. The grating controlling apparatus according to claim 2, wherein the grating is a liquid crystal grating; and the liquid crystal grating comprises:

a first transparent electrode layer configured to comprise a plurality of first electrodes arranged in parallel;

a second transparent electrode layer configured to be arranged opposite to the first transparent electrode layer and comprise a plurality of second electrodes arranged in parallel, wherein the first electrodes and the second electrodes are extended in a same direction and are arranged alternately; and wherein each second electrode has an opposite overlapping section with each of two adjacent first electrodes respectively; and a liquid crystal layer configured to be arranged between the first transparent electrode layer and the second transparent electrode layer, wherein a width of one grating element of the liquid crystal grating substantially equals to a width of one opposite overlapping section between one first electrode and a corresponding second electrode.

5. The grating controlling apparatus according to claim 4, wherein the plurality of first electrodes is arranged in sequence without gaps;

the plurality of second electrodes is arranged in sequence without gaps;

a width of one of the first electrodes substantially equals to a width of one of the second electrodes; and a width of one grating element substantially equals to one half of the width of one of the first electrodes.

6. A three-dimensional (3D) display device, comprising a grating controlling apparatus for achieving 3D displaying, in which a grating cooperates with a display panel used for outputting left-eye images and right-eye images to achieve the 3D displaying, the grating controlling apparatus comprising:

an eye tracking circuit configured to obtain a current position of an eye of an observer who is observing 3D images;

a calculating circuit configured to calculate a distance S between the current position and a base position in a direction parallel to a connection line of the left-eye and the right-eye of the observer, wherein the grating comprises an original slit position; and the base position is a position when the left-eye images are observed by the left-eye of the observer through the original slits and the right-eye images are observed by the right-eye of the observer through the original slits simultaneously; and a driving circuit configured to adjust slit positions of the grating according to the current position, so as to enable the left-eye images to be observed by the left-eye of the observer through the adjusted slits, while to enable the right-eye images to be observed by the right-eye of the observer through the adjusted slits, wherein the grating is a liquid crystal grating, the driving circuit adjusts slit positions of the grating on the basis of the original slit position, according to the distance S, and the driving circuit comprises:

a first determining circuit configured to determine a corresponding value t, when the distance S is within the following value range:

$$\left[\frac{(2t-1)I}{2n}+2mI,\ \frac{(2t+1)I}{2n}+2mI\right],$$

where t=0, 1, 2, ... n, m∈N, I is an interpupillary distance of human eyes, n is a number of grating elements corresponding to a width of one slit of the liquid crystal grating;

a second determining circuit configured to determine a moving direction from the base position to the current position; and an execution circuit configured to enable the slit position of the grating to move by t grating elements in the moving direction from the base position to the current position.

7. The 3D display device according to claim 6, wherein the grating is a liquid crystal grating; and the liquid crystal grating comprises:

a first transparent electrode layer configured to comprise a plurality of first electrodes arranged in parallel;

a second transparent electrode layer configured to be arranged opposite to the first transparent electrode layer and comprise second plate-like electrodes; and a liquid crystal layer configured to be arranged between the first transparent electrode layer and the second transparent electrode layer, wherein a width of one grating element of the liquid crystal grating substantially equals to a width of one first electrode.

8. The 3D display device according to claim 6, wherein the grating is a liquid crystal grating; and the liquid crystal grating comprises:

a first transparent electrode layer configured to comprise a plurality of first electrodes arranged in parallel;

a second transparent electrode layer configured to be arranged opposite to the first transparent electrode layer and comprise a plurality of second electrodes arranged in parallel, wherein the first electrodes and the second electrodes are extended in a same direction and are arranged alternately; and wherein each second electrode has an opposite overlapping section with each of two adjacent first electrodes respectively; and a liquid crystal layer configured to be arranged between the first transparent electrode layer and the second transparent electrode layer, wherein a width of one grating element of the liquid crystal grating substantially equals to a width of one opposite overlapping section between one first electrode and a corresponding second electrode.

9. The 3D display device according to claim 8, wherein the plurality of first electrodes is arranged in sequence without gaps;

the plurality of second electrodes is arranged in sequence without gaps;

a width of one of the first electrodes substantially equals to a width of one of the second electrodes; and a width of one grating element substantially equals to one half of the width of one of the first electrodes.

* * * * *